United States Patent
Humpisch et al.

(10) Patent No.: US 7,657,472 B2
(45) Date of Patent: Feb. 2, 2010

(54) METHOD FOR PROCESSING DIFFERENT GROUPS OF PAPERS OF VALUE

(75) Inventors: Jens Humpisch, München (DE); Matthias Langlotz, Hohenbrunn (DE); Norbert Hennen, München (DE); Christian Casensky, Dachau (DE)

(73) Assignee: Giesecke & Devrient GmbH, Munich (DE)

( * ) Notice: Subject to any disclaimer, the term of this patent is extended or adjusted under 35 U.S.C. 154(b) by 1199 days.

(21) Appl. No.: 10/381,196

(22) PCT Filed: Oct. 1, 2001

(86) PCT No.: PCT/EP01/11336

§ 371 (c)(1), (2), (4) Date: Aug. 14, 2003

(87) PCT Pub. No.: WO02/31782

PCT Pub. Date: Apr. 18, 2002

(65) Prior Publication Data

US 2004/0024663 A1    Feb. 5, 2004

(30) Foreign Application Priority Data

Oct. 6, 2000    (DE) ............... 100 49 433

(51) Int. Cl.
*G06Q 40/00* (2006.01)
*G06K 9/00* (2006.01)

(52) U.S. Cl. ............ 705/35; 382/137; 209/534

(58) Field of Classification Search .......... 705/35; 382/137

See application file for complete search history.

(56) References Cited

U.S. PATENT DOCUMENTS

| | | | |
|---|---|---|---|
| 4,414,730 A | | 11/1983 | Ohmura et al. |
| 4,707,843 A | * | 11/1987 | McDonald et al. ............ 377/8 |
| 5,159,548 A | * | 10/1992 | Caslavka ..................... 705/45 |
| 5,198,975 A | * | 3/1993 | Baker et al. .................. 705/45 |
| 5,204,811 A | * | 4/1993 | Bednar et al. ................ 705/45 |
| 5,247,159 A | | 9/1993 | Yuge et al. |
| 5,917,930 A | | 6/1999 | Kayani et al. |
| 7,133,741 B2 | * | 11/2006 | Matzig et al. ............... 700/221 |

(Continued)

FOREIGN PATENT DOCUMENTS

DE      31 37 667 C2     4/1982

(Continued)

OTHER PUBLICATIONS

"Bank Note Sorting Machine", Korea Trade & Investment, Sep. 1, 1999.*

*Primary Examiner*—Matthew S Gart
*Assistant Examiner*—Scott A Zare
(74) *Attorney, Agent, or Firm*—Bacon & Thomas, PLLC

(57) ABSTRACT

A method for processing papers of value in which different groups of papers of value are processed one after the other, such that for each group of papers of value an accounting unit is opened, an identification is inputted or read for each accounting unit and the identification is associated with an accounting unit, for the purpose of opening the accounting unit, only when a prior accounting unit is closed, and a check is made of whether an input for the groups of papers of value is empty.

9 Claims, 2 Drawing Sheets

U.S. PATENT DOCUMENTS

2001/0050247 A1* 12/2001 Myer, Sr. .................... 209/534
2002/0040865 A1* 4/2002 Steinkogler et al. ......... 209/534
2004/0211829 A1* 10/2004 Steinkogler et al. ......... 235/379

FOREIGN PATENT DOCUMENTS

EP 0 710 944 A2 5/1996
EP 07 10 944 A2 5/1996

* cited by examiner

METHOD FOR PROCESSING DIFFERENT GROUPS OF PAPERS OF VALUE

BACKGROUND

A. Field

The present invention relates to a method for processing sheet material, in particular papers of value such as bank notes, checks, etc., by which different groups of sheet material are processed one after the other.

B. Related Art

In known methods for processing papers of value (hereinafter "sheet material", bank note processing machines are used for processing different groups of such sheet material one after the other. The different groups of sheet material are constituted by different groups of bank notes, which in turn correspond to different deposits or deliveries, as result for example in the accounting for different customers of a bank. The different groups of bank notes can also come from a single customer of the bank, for example a department store. The different groups of bank notes are then for example the daily receipts of different cash registers. During processing, the bank notes are normally checked for authenticity, the value of the bank notes is determined, each group of bank notes constituting an accounting unit for which the total value of the bank notes is determined. The individual bank notes are furthermore sorted and stacked, the criterion used being for example the value of the bank notes. For processing the groups of bank notes or accounting units, two methods have become known.

In the first known method, an operator opens for each group of bank notes an accounting unit to which the particular group of bank notes is assigned during processing with the bank note processing machine. Then the bank notes are inserted by the operator into the bank note processing machine and processing is effected. Bank notes that could not be correctly recognized during processing, for example because they were recognized as forgeries or suspected forgeries or because a disturbance occurred during processing in the bank note processing machine, are stacked in a special output unit. These bank notes must be reprocessed, either by another processing operation in the bank note processing machine or by the operator. Then the accounting unit is closed by the operator and the processing of a further accounting unit can be effected, as described above.

It has turned out to be a disadvantage of the known method that the operator must perform a plurality of operating steps on the bank note processing machine for each of the accounting units. He must make many inputs by means of an input unit, for example a keyboard. This results altogether in a high time requirement for accounting for the different groups of bank notes. Moreover, there is high proneness to error in operating the bank note processing machine since the given operating steps must be precisely adhered to and the monotonous, constantly repeating sequence of operating steps for processing each accounting unit leads to lack of concentration and symptoms of fatigue in the operator.

In the second known method, the different groups of bank notes are subdivided by separation cards before processing with the bank note processing machine. Each separation card is assigned an accounting unit in the bank note processing machine by the operator. Then a stack consisting of a plurality of groups of bank notes separated by separation cards is processed automatically and continuously by the processing machine. Processing of bank notes is effected analogously as described above for the first method. Additionally, the bank note processing machine heeds the separation cards during processing. On the one hand, the bank note processing machine recognizes the end or beginning of an accounting unit. On the other hand, the operator's assignment of separation cards to certain accounting units permits the machine to credit the accounting unit with the data determined for the associated group of bank notes.

The second known method has advantages over the first known method with respect to the time required for accounting for the different groups of bank notes but, on the one hand, it involves the problem that separation of the different groups of bank notes by the operator by means of separation cards is error-prone. On the other hand, in case of a disturbance in the bank note processing machine, e.g. a jam or overlap of bank notes, it is virtually impossible to associate all bank notes of a group of bank notes with the correct accounting unit or the accordingly assigned separation card. It is therefore no longer possible to correctly account for the different groups of bank notes and assign them to the particular deliverer.

SUMMARY OF THE DISCLOSURE

The objective of the present invention is therefore to provide a method for processing sheet material, in particular papers of value such as bank notes, checks, etc., by which different groups of sheet material are processed one after the other that allows simple and less error-prone operation.

In a method for processing sheet material, in particular papers of value such as bank notes, checks, etc., by which different groups of sheet material are processed one after the other, the invention starts out from the consideration of largely doing without inputs by an operator and instead analyzing the progress of processing by monitoring the presence of sheet material in an input area, and closing or opening an accounting unit for the particular group of sheet material in accordance therewith.

The advantage of the invention is in particular that saving inputs by an operator permits accelerated processing of different groups of sheet material, resulting in a higher throughput, which is further improved by the fact that an identification for one group of sheet material can be detected while another group of sheet material is being processed. Moreover, processing is less prone to errors as otherwise occur during operation, since inputs by the operator are no longer required. Due to the processing of one group of sheet material or accounting unit at a time, no problems can moreover arise in the association of sheet material with different groups of sheet material if errors occur within a processing machine used, e.g. a jam or overlap of sheet material.

DESCRIPTION OF THE DRAWINGS

To facilitate understanding, only the elements will be described in the following that are of importance in connection with the present invention.

FIG. 1 shows a basic structure of processing machine 1 for processing different groups of sheet material constituting papers of value. In the following, processing machine 1 and the sequence of processing will be described by way of example with reference to the processing of different groups of bank notes.

Figure 1:
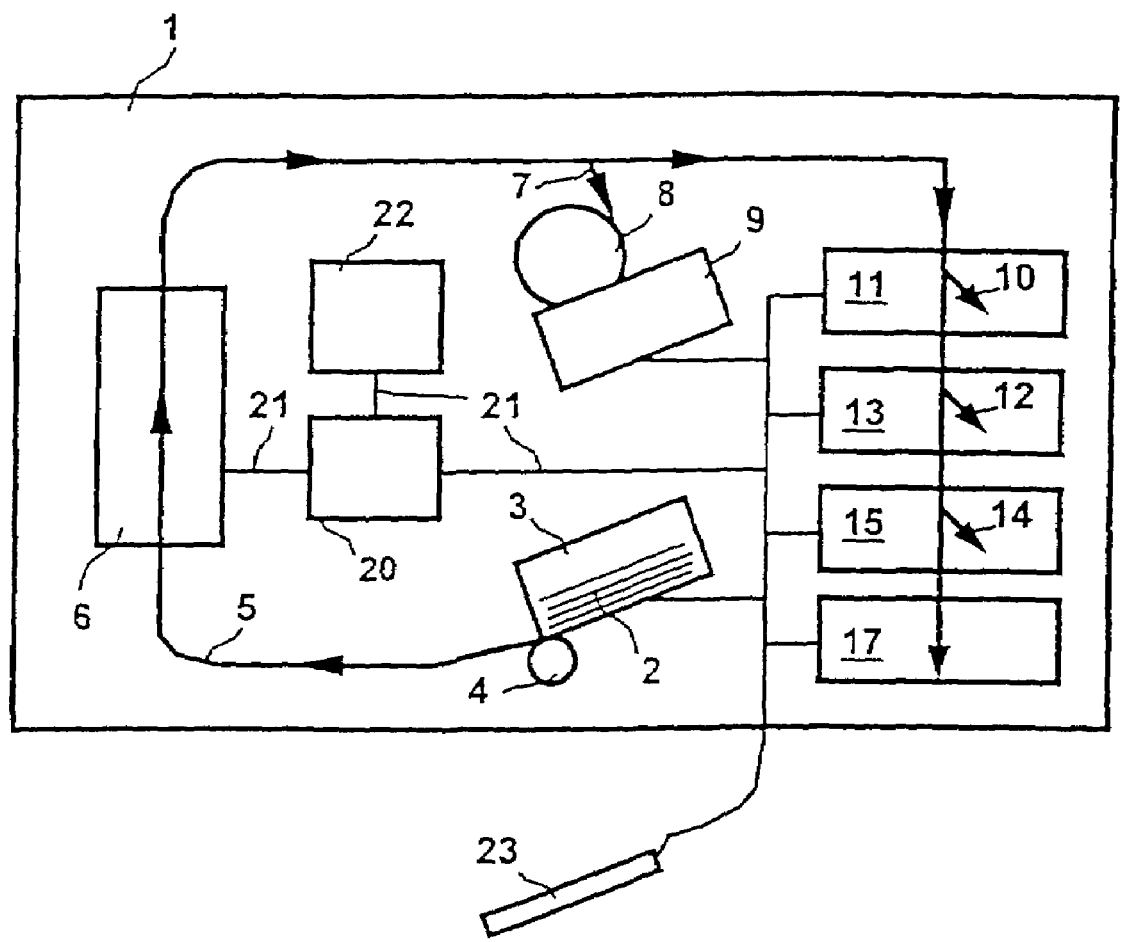
FIG. 1 shows a basic structure of a processing machine for processing different groups of sheet material (papers of value)

Bank note processing machine 1 has input area 3 for inputting bank notes 2 to be processed and singling unit 4 for transferring single bank notes 2 to transport system 5. Transport system 5 transports singled bank notes through sensor unit 6 that checks the singled bank notes together with control device 20. In accordance with the check the singled bank notes are transported by transport system 5 to output units 8, 9, 11, 13, 15, 17, diverters 7, 10, 12, 14 being actuated by control device 20 in accordance with the result of the check for supplying sheet material to the particular output unit.

The output units can, as shown for output unit 8, 9, be formed as so-called spiral slot stackers having rotating unit 8 with spiral-shaped pockets into which the singled bank notes are inserted by transport system 5 for stacking them in output 9.

Controller 20 is connected by control lines 21 with the elements of bank note processing machine 1 and evaluates data coming from the elements for controlling the elements. Beside the abovementioned data from sensor unit 6, further data relate for example to input 3 and output unit 8, 9, which have e.g. light barriers to be able to detect whether bank notes are located in input 3 or output 9. Connected to control device 20 is furthermore input/output device 22, for example a keyboard and/or printer and/or display and/or touch screen. Additionally, reading unit 23, e.g. a bar code reader, is connected to control device 20 to permit detection of information.

During processing of sheet material 2 the single bank notes are checked and transported into one of output units 11, 13, 15, 17 in accordance with the check result, for example in accordance with the value or denomination, as described above. Output 9 is used as reject pocket RF which receives bank notes that could not be correctly checked, e.g. because they were forgeries, suspected forgeries or could not be processed properly due to a disturbance in bank note processing machine 1, for example faulty singling of more than one bank note by singling unit 4.

Figure 2:
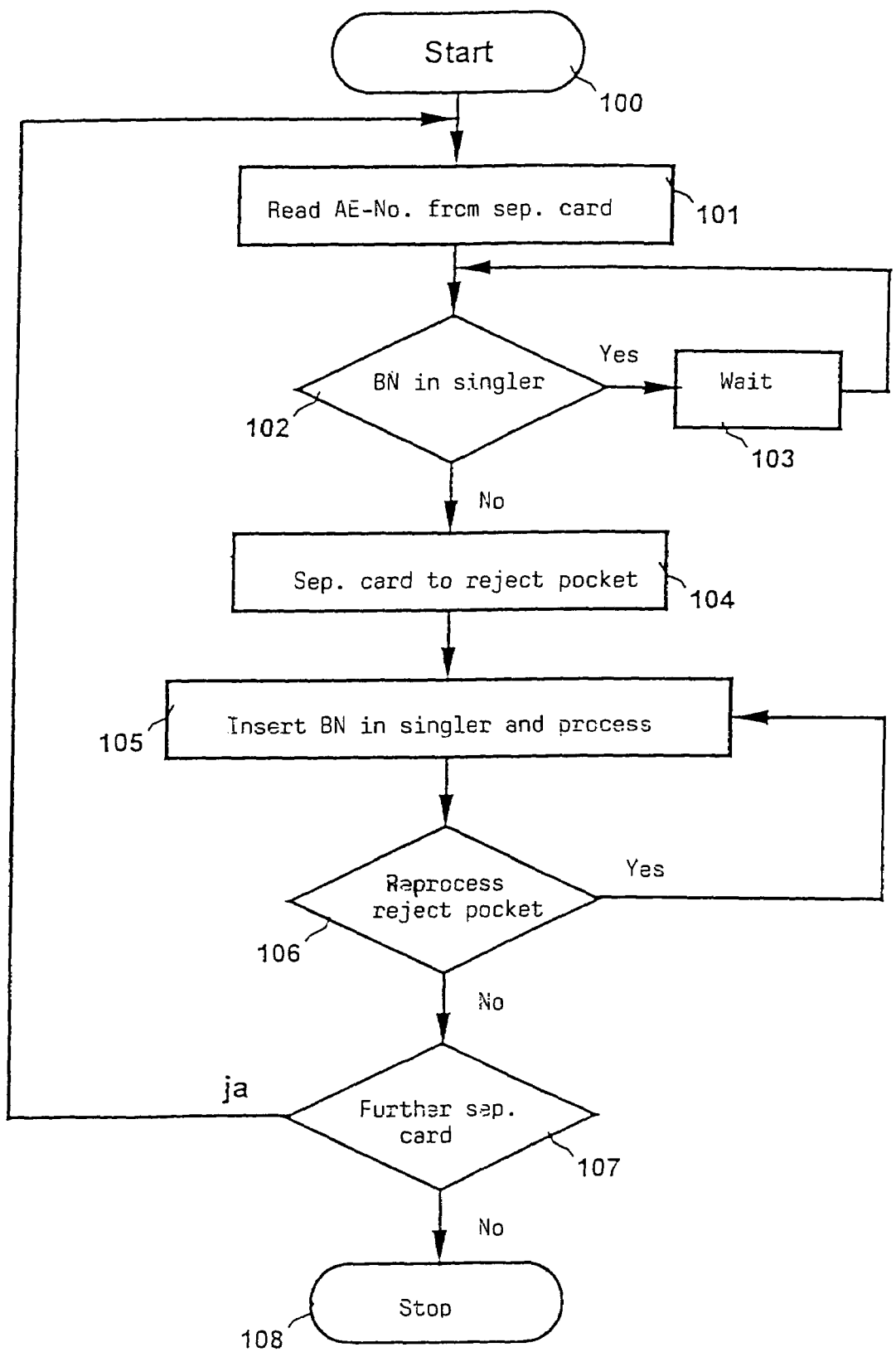
FIG. 2 shows an example of a flowchart for processing different groups of sheet material (papers of value).

The processing of different groups of bank notes will be described in the following with reference to the flowchart shown in FIG. 2 by way of example for the processing of different groups of bank notes by bank note processing machine 1 shown in FIG. 1.

In first processing step 100, processing is started for different groups of bank notes for each of which accounting unit AE is to be formed. This can be effected for example by means of input/output unit 22, by selection from a menu control. During selection and before processing of the first group of bank notes, no bank notes are in input area 3, no accounting unit AE is open, i.e. not yet finally accounted for, and transport system 5 is standing still.

In second processing step 101, identification number AE-No, which is associated or will be associated later with a deliverer for example, is read for the accounting unit to be formed. This can be done for example with bar code reader 23 which reads a bar code from a separation card for example. A separation card is particularly suitable since it can be used in further processing. It is also possible, however, to input corresponding identification number AE-No by means of input/output device 22. At this time there are still no bank notes in input area 3, controller 20 is opening first accounting unit AE1, transport system 5 is standing still.

In third processing step 102, a check is made, e.g. by evaluation of the signals from the light barrier, whether bank notes are in input area 3. This can be omitted during processing of first accounting unit AE1, however. After that, transport system is started automatically or by the operator actuating a start key.

In fourth processing step 104, the separation card is transferred to reject pocket RF (8, 9). This can be done for example by the operator inserting the separation card into reject pocket 9. It is also possible to insert the separation card into input area 3 so that it is grasped by singling unit 4 and transferred by transport system to reject pocket 9, under the control of controller 20 and with actuation of diverter 7.

In fifth processing step 105, the first group of bank notes forming first accounting unit AE1 is inserted into input area 3. Instead of the separation card being inserted sin-inserted singly into input area 3, as described above, it can also be inserted together with the associated group of bank notes. Then the processing of the bank notes is started, the bank notes are checked and accounted for as described above in connection with FIG. 1. The result of accounting, in particular number and denomination of the bank notes and total value, is associated with first accounting unit AE1 by controller 20.

In sixth processing step 106 a check is made of whether bank notes were unable to be recognized during the check and were therefore transported to reject pocket 9, e.g. by the operator or by evaluation of the light barrier by controller 20. Should such bank notes be present, they can be reprocessed by bank note processing machine 1 by being removed from reject pocket 9 by the operator and reinserted into input area 3. The check and association with accounting unit AE1 is effected analogously as described above. If bank notes are still present in reject pocket 9 after the repeated check, further repetitions are possible. Finally, the separation card and bank notes, if still present, are removed from reject pocket 9 to permit them to be rechecked at a later time and any bank notes still present to be associated with accounting unit AE1 by means of the separation card. However, the bank notes can also remain in reject pocket 9 together with the associated separation card, since the bank notes of different groups of bank notes, i.e. different accounting units, are separated by the separation cards.

In seventh processing step 107, it is checked whether further accounting unit AE2 is to be processed. The operator can thus be asked for example by the control device via display 22 to input or read a further identification number for further accounting unit AE2.

If no further processing is desired, processing is ended by the operator, for example by actuating a stop key. When processing is ended, accounting unit AE1 is closed by control device 20. The accounting data of accounting unit AE1 are thus available for later evaluation. The accounting data of accounting unit AE1 can be made available to other processing stations by means of data carriers, such as floppy disks, or a network connection or by a printout. Bank note processing machine 1 or transport system 5 can be turned off or stopped by control device 20.

If further accounting unit AE2 is to be processed, the above-described processing is resumed at second processing step 101. First, the identification number of accounting unit AE2 is read from a separation card. In subsequent third processing step 102, it is checked whether bank notes are still present in input area 3. If bank notes are still present they must come from prior accounting unit AE1. Processing of new accounting unit AE2 can thus not be started 103 until these bank notes are processed. If input 3 is empty, the processing of prior accounting unit AE1 is complete and accounting unit AE1 is closed by controller 20. Thus, new accounting unit AE2 can be opened by controller 20 and further processing performed as in the above description. In contrast to the above-described processing of first accounting unit AE1, transport system 5 is already turned on in the case of following accounting unit AE2.

It is thus essential that a new accounting unit is always opened only in case a valid identification number was inputted, and that input area 3 is empty. This avoids mixtures of different groups by bank notes and it is possible to open new accounting units without additional, time-consuming and error-prone inputs by the operator.

Further, for checking the validity of the identification numbers a check can be made of whether the identification numbers have a given length and/or whether a new identification number differs from the prior identification number or all prior ones.

Processing can be further improved if singling unit 4 is only started if no new identification number for a new accounting unit was inputted in case of an open, i.e. not yet closed, accounting unit, and if bank notes are in input area 3.

The identification number of the separation card can also be detected with sensor unit 6, instead of with bar code reader 23 as described above, if the separation card is inserted into input area 3 together with the bank notes. If a further sensor (not shown), e.g. a bar code reader, is provided in reject pocket 9, the identification number of the separation card can also be detected in reject pocket 9 if the separation card was transported to reject pocket 9 either by the user or by transport system 5 as described above.

In a variant of processing, it is provided that the separation card is placed on the top of the group of bank notes—in the described example—before they are inserted into input area 3. This causes the separation card to be singled last and—if bank notes were rejected—placed in reject pocket 9 last. Of course, the separation card can also be inserted into reject pocket 9 by the operator after the end of processing. The identification number of the separation card can be detected by bar code reader 23, input/output device 22, sensor unit 6 or by an additional sensor in reject pocket 9 as described above. If the additional sensor of reject pocket 9 is used when the separation card is processed last, the identification number of the separation card is assigned to the accounting unit only at the end of processing. The described order in which processing of the separation card is effected last has the advantage that the separation cards or associated bank notes stacked in reject pocket 9 can be checked by the operator at a glance, so that the proper end of processing of a group of notes or accounting unit can be ascertained. This check can also be done automatically by the further sensor.

To facilitate later reprocessing of bank notes stacked in reject pocket 9 it can be provided that the separation cards of groups of notes or accounting units in which no notes were rejected are removed from reject pocket 9 or not placed therein. A buffer (not shown) can thus be provided in reject pocket 9, e.g. in the form of an intermediate bottom, on which the notes or separation cards are stacked during processing of an accounting unit. If only the separation card was placed on the intermediate bottom after the end of the accounting unit, it is removed automatically or the operator is asked to do so by controller 20 via input/output device 22. If bank notes were rejected, the intermediate bottom is extracted from reject pocket 9 so that the bank notes and associated separation card are stacked in reject pocket 9. Then the intermediate bottom is reinserted into reject pocket 9 for processing the next accounting unit.

Further, it can be provided that a plurality of accounting units are combined into a superordinate accounting unit. For example, the accounting units corresponding to the daily receipts of all cash registers of a department store can be combined into a superordinate accounting unit representing the store. Another superordinate accounting unit can be formed e.g. for all accounting units processed on one bank note processing machine 1. A further superordinate accounting unit can be formed for all accounting units processed by one operator, e.g. within a processing shift.

The invention claimed is:

1. A method for consecutively processing different groups of papers of value including first and second groups in a bank note processing machine having an input area, the method comprising the following steps:

placing only the first group into the input area of the bank note processing machine;

inputting or reading a first identification of the first group and associating the first identification with a first accounting unit;

processing the first group such that the bank note processing machine removes the first group from the input area;

while processing the first group, inputting or reading a second identification of the second group and associating the second identification with a second accounting unit;

checking whether the input area for the first group is empty; and then closing the first accounting unit and opening the second accounting unit only when the input area is empty after processing the first group; and then placing the second group into the input area such that the bank note processing machine automatically processes the second group after entry of the second group into the input area.

2. The method according to claim 1, wherein papers of value are processed when an accounting unit is opened, and no new identification is inputted or read when papers of value are present in the input area.

3. The method according to claim 1, further comprising the step of checking the validity of the identification.

4. The method according to claim 1, wherein the identification is read by means of a bar code reader.

5. The method according to claim 1, wherein the identification is part of a separation card, and the separation card is used for separating bank notes from different groups of bank notes that cannot be processed clearly or faultlessly during processing.

6. The method according to claim 5, wherein faulty separation cards and papers of value are transported to and stored in a reject pocket.

7. The method according to claim 6, wherein the faulty separation card and papers of value of a corresponding one of the accounting units are removed from the reject pocket before processing of another one of the accounting units.

8. The method according to claim 1, wherein at least the first and second accounting units are combined into a superordinate accounting unit.

9. The method according to claim 1, wherein the data of the accounting units are made available for further processing in electronic form and/or as a printout.

* * * * *

UNITED STATES PATENT AND TRADEMARK OFFICE
CERTIFICATE OF CORRECTION

PATENT NO. : 7,657,472 B2  Page 1 of 1
APPLICATION NO. : 10/381196
DATED : February 2, 2010
INVENTOR(S) : Humpisch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1561 days.

Signed and Sealed this

Fourth Day of January, 2011

David J. Kappos
*Director of the United States Patent and Trademark Office*